(12) United States Patent
Dingman et al.

(10) Patent No.: US 10,794,508 B2
(45) Date of Patent: Oct. 6, 2020

(54) ATMOSPHERE CONTROL MANIFOLD (71) Applicant: TPS IP, LLC, Cleveland, OH (US)

(72) Inventors: Lyle Oscar Dingman, East Troy, WI (US); Michael Abraham Schneck, New Berlin, PA (US); Gary Allen Hanson, Janesville, WI (US); David Allen Strand, Burlington, WI (US); Michael Laddie Grande, Elkhorn, WI (US); Geoffry Allen Gromiuk, Mukwonago, WI (US); Steven Edward Kempowski, Oconomowoc, WI (US); Jon Allen Ludlum, Darien, WI (US); Necat Demiri, East Troy, WI (US)

(73) Assignee: TPS IP, LLC, Cleveland, OH (US)

( * ) Notice: Subject to any disclaimer, the term of this patent is extended or adjusted under 35 U.S.C. 154(b) by 18 days.

(21) Appl. No.: 15/922,623

(22) Filed: Mar. 15, 2018

(65) Prior Publication Data

US 2019/0145539 A1    May 16, 2019

Related U.S. Application Data

(60) Provisional application No. 62/585,984, filed on Nov. 14, 2017.

(51) Int. Cl.
*F16K 27/00* (2006.01)
*F16L 41/03* (2006.01)
(Continued)

(52) U.S. Cl.
CPC .............. *F16K 27/003* (2013.01); *A21B 3/04* (2013.01); *F16L 41/03* (2013.01); *F16K 37/00* (2013.01)

(58) Field of Classification Search
CPC ..... Y10T 137/87885; F23N 3/085; F23N 3/06; F16K 27/003; F15B 13/086;
(Continued)

(56) References Cited

U.S. PATENT DOCUMENTS

RE31,529 E * 3/1984 Lowe ...................... C03B 9/406
                                                        137/596.16
4,509,553 A * 4/1985 Hahn ................... B60H 1/0065
                                                        137/353
(Continued)

FOREIGN PATENT DOCUMENTS

DE    102006029902 A1    1/2008
WO    2013/171181 A1    11/2013

OTHER PUBLICATIONS

Non-Final Office Action received for U.S. Appl. No. 15/922,584 dated Mar. 2, 2020, 43 pages.
(Continued)

*Primary Examiner* — Seth W. Mackay-Smith
(74) *Attorney, Agent, or Firm* — Amin, Turocy & Watson, LLP (57) ABSTRACT

One or more techniques regarding an atmosphere controlling manifold are provided. For example, one or more embodiments can regard a manifold that can comprise a first channel connected to a first inlet port. The manifold can also comprise a second channel connected to second inlet port. Further, the manifold can comprise a third channel connecting the first channel, the second channel, and an outlet port. Additionally, the manifold can comprise a valve connected to the third channel and regulating fluid communication through the third channel. Moreover, the first channel, the second channel, and third channel can be defined within a body of the manifold.

17 Claims, 10 Drawing Sheets

(51) Int. Cl.
   *F16K 37/00* (2006.01)
   *A21B 3/04* (2006.01)
(58) Field of Classification Search
   CPC .... F15B 13/0817; F15B 13/0814; A21B 3/07; A21B 3/04
   USPC .......................................... 137/884; 126/39 N
   See application file for complete search history.

(56) References Cited

U.S. PATENT DOCUMENTS

| | | | | |
|---|---|---|---|---|
| 4,512,362 | A * | 4/1985 | Groeschner | F15B 13/0814 137/356 |
| 4,712,578 | A * | 12/1987 | White | |
| 4,726,399 | A * | 2/1988 | Miller | F16L 41/021 137/597 |
| 4,830,054 | A * | 5/1989 | Feichtiger | F15B 13/0814 137/269 |
| 4,913,189 | A * | 4/1990 | Kline | B60H 1/00642 137/560 |
| 5,107,897 | A * | 4/1992 | Stoll | B23Q 1/03 137/271 |
| 5,121,513 | A * | 6/1992 | Thomas | A61G 7/001 137/884 |
| 5,235,903 | A * | 8/1993 | Tippmann | A21B 3/04 126/20 |
| 5,417,246 | A * | 5/1995 | Perkins | A61M 1/0031 137/870 |
| 5,657,786 | A * | 8/1997 | DuRoss | C23C 16/4408 134/166 C |
| 5,927,337 | A * | 7/1999 | LaMantia | F15B 13/0807 137/883 |
| 5,993,878 | A * | 11/1999 | Tippmann | A21B 3/04 426/510 |
| 6,578,600 | B1 * | 6/2003 | Young, Jr. | F16K 27/003 118/715 |
| 6,713,741 | B2 | 3/2004 | Miller | |
| 6,766,830 | B2 * | 7/2004 | Rondreux | F15B 13/0807 137/269 |
| 7,191,800 | B2 * | 3/2007 | Berner | F15B 13/0814 137/553 |
| 7,484,527 | B2 * | 2/2009 | Tamaki | F16K 51/02 137/596.1 |
| 8,082,943 | B2 * | 12/2011 | Brenner | F15B 13/081 137/271 |
| 8,172,546 | B2 * | 5/2012 | Cedrone | F04B 7/0076 137/884 |
| 8,753,097 | B2 * | 6/2014 | Cedrone | F04B 15/02 137/884 |
| 8,807,164 | B2 * | 8/2014 | Baier | G01N 30/20 137/597 |
| 9,732,876 | B2 * | 8/2017 | Johnson | F16K 31/1223 |
| 10,008,037 | B1 | 6/2018 | Worley, III et al. | |
| 9,921,641 | B1 | 8/2018 | Worley, III et al. | |
| 10,504,384 | B1 | 12/2019 | Drake | |
| 2003/0061773 | A1 | 4/2003 | O'Leary | |
| 2007/0095413 | A1 * | 5/2007 | Zhu | F16K 27/003 137/883 |
| 2009/0090347 | A1 | 4/2009 | Kim et al. | |
| 2009/0194090 | A1 | 8/2009 | Kim et al. | |
| 2010/0128755 | A1 | 5/2010 | Luckhardt et al. | |
| 2011/0036826 | A1 | 2/2011 | Feng et al. | |
| 2011/0050872 | A1 | 3/2011 | Harbert et al. | |
| 2014/0203012 | A1 | 7/2014 | Corona et al. | |
| 2015/0019017 | A1 | 1/2015 | Bodine et al. | |
| 2015/0118632 | A1 | 4/2015 | Liu | |
| 2016/0140728 | A1 | 5/2016 | Aonuma et al. | |
| 2016/0160880 | A1 * | 6/2016 | Douglas | F04B 49/106 137/14 |
| 2016/0187001 | A1 | 6/2016 | Bombardieri et al. | |
| 2016/0356388 | A1 * | 12/2016 | Inoue | B24B 57/02 |
| 2016/0374501 | A1 | 12/2016 | Logan et al. | |
| 2017/0208652 | A1 | 7/2017 | Luckhardt et al. | |
| 2017/0243515 | A1 | 8/2017 | Vengroff et al. | |
| 2018/0032125 | A1 | 2/2018 | Peterson et al. | |
| 2018/0062691 | A1 | 3/2018 | Barnett, Jr. | |
| 2018/0101608 | A1 | 4/2018 | Thysell | |
| 2018/0114372 | A1 | 4/2018 | Nagy et al. | |
| 2018/0163971 | A1 | 6/2018 | Mizusaki et al. | |
| 2018/0181094 | A1 | 6/2018 | Funk et al. | |
| 2018/0345485 | A1 | 12/2018 | Sinnet et al. | |
| 2019/0062084 | A1 * | 2/2019 | Delieutraz | B65H 3/0816 |
| 2019/0066239 | A1 | 2/2019 | Touchette et al. | |
| 2019/0121522 | A1 | 4/2019 | Davis et al. | |
| 2019/0295330 | A1 | 9/2019 | Nagy et al. | |
| 2020/0005669 | A1 | 1/2020 | Thysell | |

OTHER PUBLICATIONS

Non-Final Office Action received for U.S. Appl. No. 15/922,605 dated Apr. 3, 2020, 53 pages.
Non-Final Office Action received for U.S. Appl. No. 15/922,445 dated May 29, 2020, 45 pages.
Non-Final Office Action received for U.S. Appl. No. 15/922,569 dated Jun. 8, 2020, 36 pages.
Final Office Action received for U.S. Appl. No. 15/922,519 dated Jun. 8, 2020, 37 pages.
Notice of Allowance received for U.S. Appl. No. 15/922,584 dated Jun. 10, 2020, 50 pages.

\* cited by examiner

ATMOSPHERE CONTROL MANIFOLD

CROSS-REFERENCE TO RELATED APPLICATIONS

This application claims priority to U.S. Provisional Patent Application Ser. No. 62/585,984 filed on Nov. 14, 2017, entitled "ATMOSPHERE CONTROL MANIFOLD." The entirety of the aforementioned application is incorporated by reference herein.

TECHNICAL FIELD

The subject disclosure relates to an atmosphere control manifold, and more specifically, to a manifold that can facilitate control and/or monitoring of a closed atmosphere system (e.g., a vacuum system and/or a pressure regulation system).

BACKGROUND ART

Conventional vacuum systems and/or pressure regulation systems can be used for a variety of functions. For example, vacuum systems and/or pressure regulation systems can be used in conjunction with ovens to create specialized baking environments. However, these systems traditionally require a substantial amount of piping and/or joinery to maintain atmospheric conditions across the system. Said piping and/or joinery can be prone to leaks, can come with significant costs (depending of the size of the system), may require expertise to install properly, and/or can be very labor intensive.

In various embodiments described herein, apparatuses and/or systems are provided that regard a manifold to replace the conventional techniques for controlling and/or monitoring a closed atmosphere system (e.g., a vacuum system and/or a pressure regulation system). For example, one or more embodiments described herein can regard a manifold that can comprise one or more pre-cast channels to control the flow of an atmosphere (e.g., create a vacuum and/or add an inert gas), and one or more ports connected to the one or more channels to facilitate monitoring of the atmosphere.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems and/or apparatuses that can facilitate management of one or more closed atmosphere systems are described.

According to an embodiment, a manifold is provided. The manifold can comprise a first channel that can be connect to a first inlet port. Also, the manifold can comprise a second channel that can be connect to a second inlet port. Further, the manifold can comprise a third channel that can connect the first channel, the second channel, and an outlet port. Additionally, the manifold can comprise a valve that can be connected to the third channel and can regulate fluid communication through the third channel. Moreover, the first channel, the second channel, and the third channel can be defined within a body of the manifold.

According to another embodiment, a system is provided. The system can comprise a manifold. The manifold can comprise a body that houses a plurality of channels. Also, the manifold can comprise a first channel from the plurality of channels that can connect to a first inlet port. Further, the manifold can comprise a second channel from the plurality of channels that can connect to a second inlet port. Moreover, the manifold can comprise a third channel from the plurality of channels that can connect the first channel, the second channel, and an outlet port. Additionally, the manifold can comprise a valve that can connect to the third channel and can regulate fluid communication through the third channel.

According to another embodiment, a manifold is provided. The manifold can comprise a body that houses a plurality of channels. Also, the manifold can comprise a vacuum channel from the plurality of channels that can connect to a vacuum inlet port. Further, the manifold can comprise an atmosphere channel from the plurality of channels that can connect to an atmosphere inlet port. Moreover, the manifold can comprise a work channel from the plurality of channels that can connect the vacuum channel, the atmosphere channel, and an outlet port. Additionally, the manifold can comprise a valve that can connect to the work channel and can regulate fluid communication through the work channel.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. As used herein, the term "work system" can refer to one or more devices and/or defined areas having an atmosphere that can be manipulated by a manifold in accordance with one or more embodiments described herein.

Figure 1:
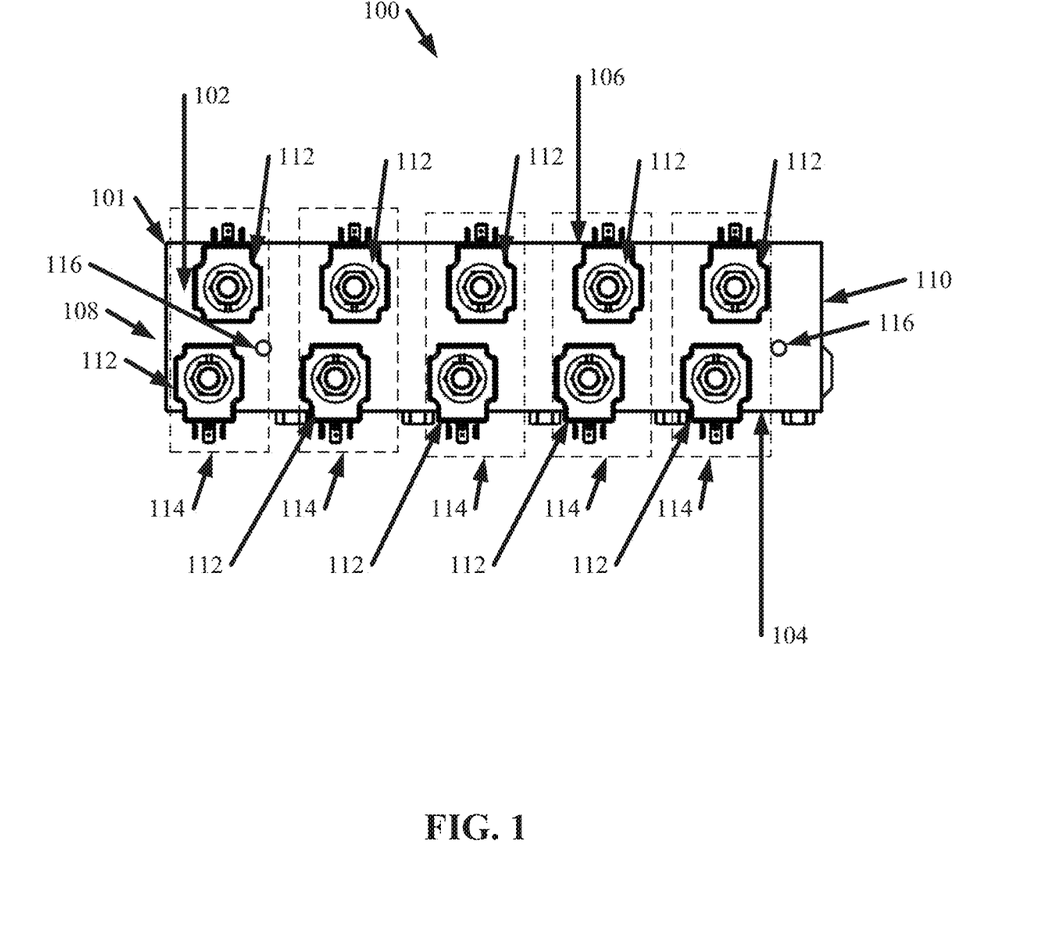
FIG. 1 illustrates a diagram of an example, non-limiting manifold from a first perspective in accordance with one or more embodiments described herein.

FIG. 1 illustrates a diagram of an example, non-limiting manifold 100 from a first perspective in accordance with one or more embodiments described herein. The manifold 100 can comprise a body 101 that can have a first side 102, a second side 104, a third side 106, fourth side 108, and/or a fifth side 110. In various embodiments, the body 101 can be made from a material with low thermal conductivity. Example, materials comprising the body 101 can include, but are not limited to: aluminum, stainless steal, and/or plastic composites.

The first side 102 can comprise a plurality of valves 112. The plurality of valves 112 can be arranged in sequential columns 114 across the first side 102, wherein each column 114 can comprise two valves 112. For example, FIG. 1 illustrates five sequential columns 114 collectively comprising a total of ten valves 112. However, embodiments comprising more or less valves 112 are also envisaged. The total number of valves 112 can vary depending on the desired functionality of the manifold 100. For example, the first side 102 can comprise dozens, hundreds, and/or thousands of valves 112.

In various embodiments, each column 114 can correspond to a respective work system that is controlled and/or monitored by the manifold 100. For example, the five columns 114 illustrated in FIG. 1 can correlate to five work systems controlled and/or monitored by the manifold 100. In one or more embodiments, a plurality of columns 114 can correspond to the same work system, wherein the manifold 100 can control and/or monitor just said work system and/or said work system and additional work systems.

Regarding each column 114, one valve 112 comprising the column 114, for example a valve 112 nearest the third side 106, can connect to a vacuum while the other valve 112, for example a valve 112 nearest the second side 104, can connect to an atmosphere supply. Thus, a vacuum for a given work system can be controlled by a column 114 of two valves 112, wherein one of the two valves 112 can connect to a vacuum to facilitate generation of a vacuum while the other valve 112 can connect to an atmosphere supply and leak atmosphere (e.g., an inert gas) into the work system to adjust one or parameters (e.g., pressure) of the vacuum. Through operation of the two valves 112 in a column 114, a user of the manifold 100 can create a vacuum with regards to a respective work system and/or adjust one or more parameters of a vacuum of a respective work system (e.g., by leaking atmosphere into the vacuum via one of the valves 112). Additionally, the one or more valves 112, and thus the one or more columns 114, can be controlled independently and/or collectively. For example, a first column 114 can be controlled independently of a second column 114 to achieve different parameters for a first work system, connected to the first column 114, than a second work system, connected to the second column 114. In another example, a first column 114 and a second column 114 can be controlled collectively. In a further example, a first column 114 and a second column 114 can be controlled collectively and independent of a third column 114.

One or more of the valves 112 can be a solenoid valve and can provide on/off control and/or proportional control regarding a respective work system. In various embodiments, the one or more valves 112 can connect to an electronic controller (not shown) to facilitate operation of the one or more valves 112. Further, the distance between valves 112 and/or columns 114 can vary depending on one or more desired functionalities of the manifold 100. For example, the columns 114 can be spaced apart so as to accommodate enough room for an attachment of a filter to the manifold 100 (e.g., as described herein below).

Furthermore, the first side 102 can comprise one or more through holes 116. The one or more through holes 116 can facilitate mounting the manifold 100 to a desired location. For example, the through holes 116 can travel through a width of the body 101, thereby enabling one or more fasteners (e.g., one or more bolts) to travel through the body 101 and facilitate a connection to a structure.

Figure 2:
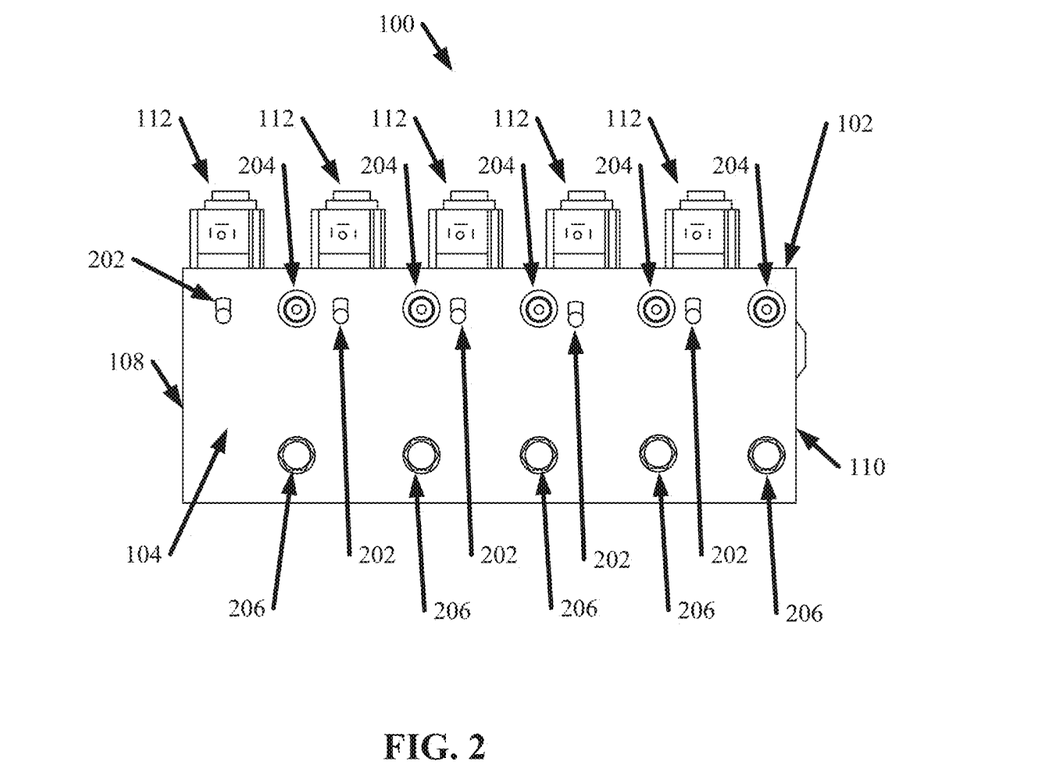
FIG. 2 illustrates another diagram of the example, non-limiting manifold from a second perspective in accordance with one or more embodiments described herein.

FIG. 2 illustrates a diagram of an example, non-liming embodiment of the second side 104 of the manifold 100. Repetitive description of like elements employed in other embodiments described herein is omitted for sake of brevity. The second side 104 can comprise one or more atmosphere metering valves 202, one or more connection ports 204, and/or one or more monitoring ports 206. In various embodiments, each work system controlled by the manifold 100 (e.g., via a corresponding column 114) can be connected to a respective atmosphere metering valve 202, connection port 204, and/or monitoring port 206. For example, FIG. 2 illustrates a manifold 100 capable of controlling and/or monitoring five work systems; thus, said manifold 100 can comprise five columns 114 (e.g., ten valves 112), five atmosphere metering valves 202, five connection ports 204, and/or five monitoring ports 206.

Each atmosphere metering valve 202 can meter an amount of atmosphere that can be allowed into a designated work system. Through use of the atmosphere metering valve 202, and for example a corresponding column 114, a work system can be finely tuned to one or more desired parameters. Each connection port 204 can facilitate a connection of a respective work system of the manifold 100 to a testing device. For example, in one or more embodiments, one or more of the connection ports 204 can facilitate connection of a transducer to a work system. The connection port 204 can facilitate a connection of the testing device (e.g., a transducer) to a test channel, which in turn can be connected to the subject work system. Therefore, the testing device (e.g. a transducer) can facilitate in testing a subject work system to determine one or more conditions (e.g., pressure) being achieved by said work system in order to calibrate and/or configure the work system to meet one or more goals (e.g., a desired pressure).

In various embodiments, each test channel can correspond to a respective work system that is controlled and/or monitored by the manifold 100. For example, manifold 100 illustrated in FIG. 2 can control and/or monitor up to five work systems; thus, the manifold's 100 body 101 can house up to five test channels (e.g., one test channel for each of the five work systems). In one or more embodiments, a plurality of test channels can correspond to the same work system, wherein the manifold 100 can control and/or monitor just said work system and/or said work system and additional work systems.

Further, in various embodiments, each test channel can be connected to a single connection port 204 (e.g., as depicted in FIG. 2). In one or more embodiments, each test channel can be connected to a plurality of connection ports 204, wherein the plurality of connection ports 204 can facilitate connection of one or more various testing devices to the manifold 100 with regard to the same work system.

Additionally, the second side 104 can comprise one or more monitoring ports 206, which can enable a user of the manifold 100 to monitor the effects rendered by the one or more testing devices. For example, one or more of the monitoring ports 206 can be SAE plugs. Each monitoring port 206 can be connected to a test channel. Thus, the one or more monitoring ports 206 can assist in monitoring the effects of a testing device connected to the same test channel, and thereby connected to the same work system. Further, the one or more monitoring ports 206 can facilitate calibrating (e.g., via connection with a calibrating device) a testing device (e.g., a transducer) connected at a corresponding connection pot 204. Thus, another advantage of the manifold 100 includes its ability to facilitate one or more calibrations.

In various embodiments, each test channel can be connected to a single monitoring port 206 (e.g., as depicted in FIG. 2), which can facilitate in monitoring one or more testing devices connected to the subject test channel. In one or more embodiments, each test channel can be connected to a plurality of monitoring ports 206, wherein the plurality of monitoring ports 206 can facilitate in monitoring one or more testing devices connected to the subject test channel.

Figure 3:
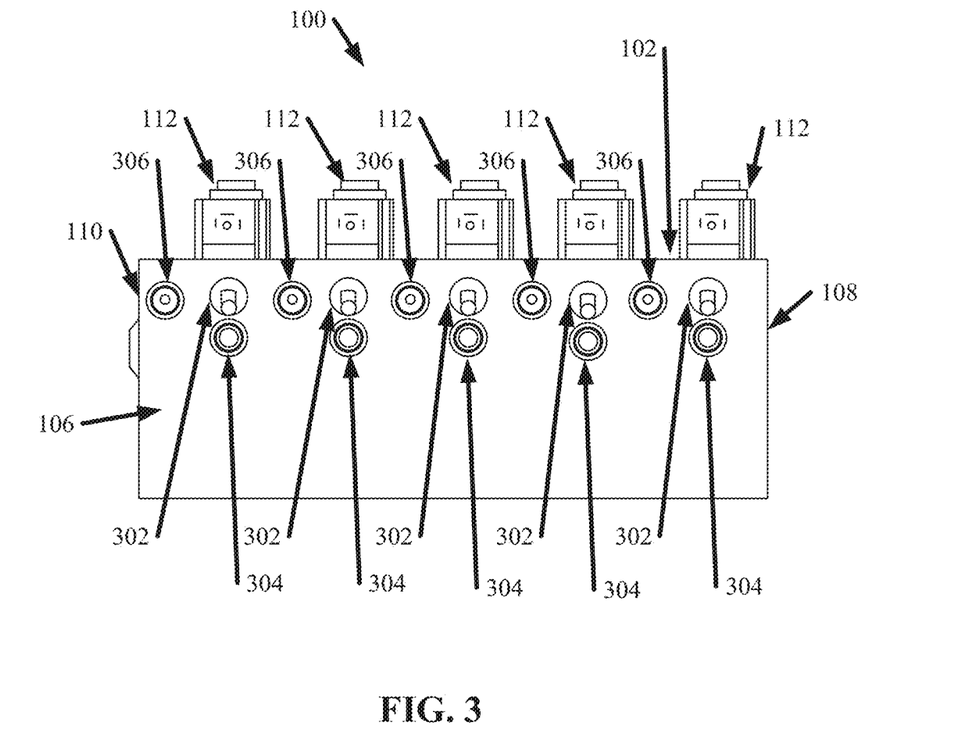
FIG. 3 illustrates another diagram of the example, non-limiting manifold from a third perspective in accordance with one or more embodiments described herein.

FIG. 3 illustrates a diagram of an example, non-liming embodiment of the third side 106 of the manifold 100. Repetitive description of like elements employed in other embodiments described herein is omitted for sake of brevity. The third side 106 can comprise one or more vacuum metering valves 302, one or more work ports 304, and/or one or more test ports 306. In various embodiments, each work system controlled by the manifold 100 (e.g., via a corresponding column 114) can be connected to a respective vacuum metering valve 302, work port 304, and/or test port 306. For example, FIG. 3 illustrates a manifold 100 capable of controlling and/or monitoring up to five work systems; thus, said manifold 100 can comprise up to five columns 114 (e.g., ten valves 112), five vacuum metering valves 302, five work ports 304, and/or five test ports 306.

Each vacuum metering valve 302 can meter the vacuum of a designated work system. Through use of the vacuum metering valve 302, and for example a corresponding column 114, a work system can be finely tuned to one or more desired parameters. One or more of the work ports 304 can facilitate a connection of one or more work channels of the manifold 100 to a work system. Further, one or more test ports 306 can facilitate a connection of one or more test channels to a work system, which can be connected to a work port 304. In some embodiments, a plurality of work ports 304 and/or test ports 306 can be connected to the same work system.

Figure 4:
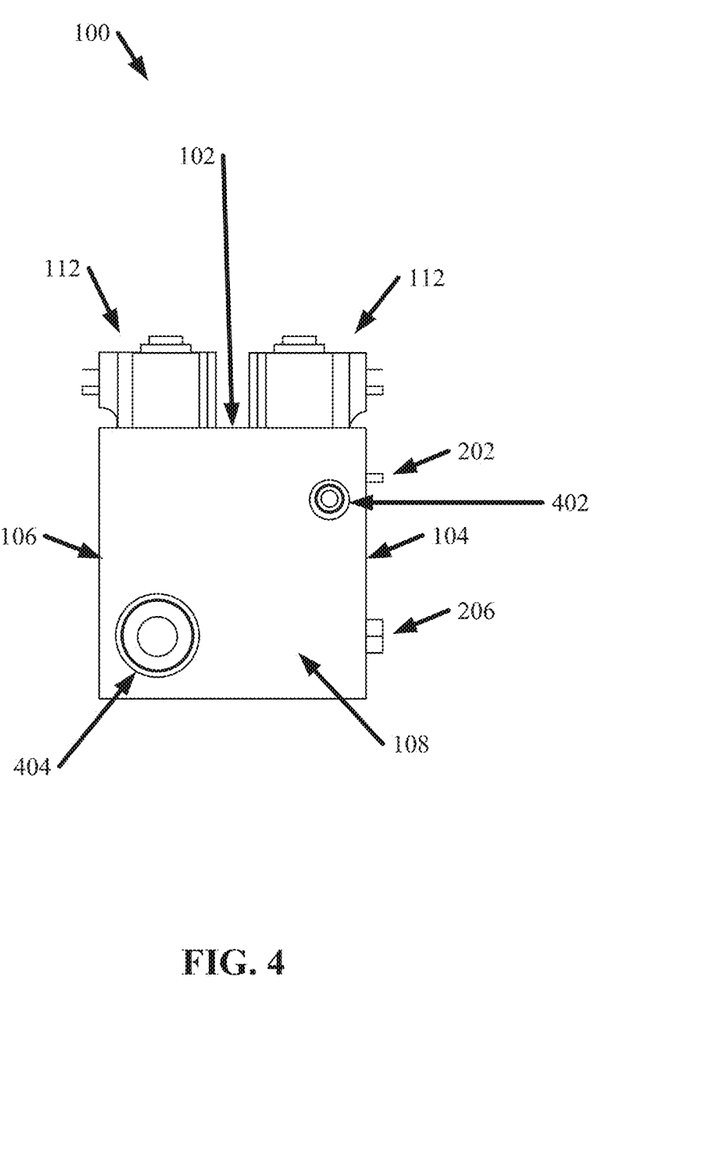
FIG. 4 illustrates another diagram of the example, non-limiting manifold from a fourth perspective in accordance with one or more embodiments described herein.

FIG. 4 illustrates a diagram of an example, non-liming embodiment of the fourth side 108 of the manifold 100. Repetitive description of like elements employed in other embodiments described herein is omitted for sake of brevity. The fourth side 108 can comprise one or more atmosphere ports 402 and/or one or more vacuum ports 404.

The one or more atmosphere ports 402 can connect to one or more atmosphere channels that can traverse the interior of the body 101 along the width of the manifold 100. The one or more vacuum ports 404 can connect to one or more vacuum channels that can traverse the interior of the body 101 along the width of the manifold 100. The one or more atmosphere channels and the one or more vacuum channels can be connected to one or more work channels. Further, the one or more atmosphere ports 402 and/or the one or more vacuum ports 404 can be threaded so as to accept a pipe, plumbing, and/or the like.

For example, a work port 304 can connect to a work channel that is also connected to a vacuum channel, which can be connected to one or more vacuum ports 404, and an atmosphere channel, which can be connected to one or more atmosphere ports 402. In various embodiments, the manifold 100 can comprise a plurality of work channels (e.g., connected to one or more work ports 304) connected to a common vacuum channel and/or a common atmosphere channel.

Figure 5:
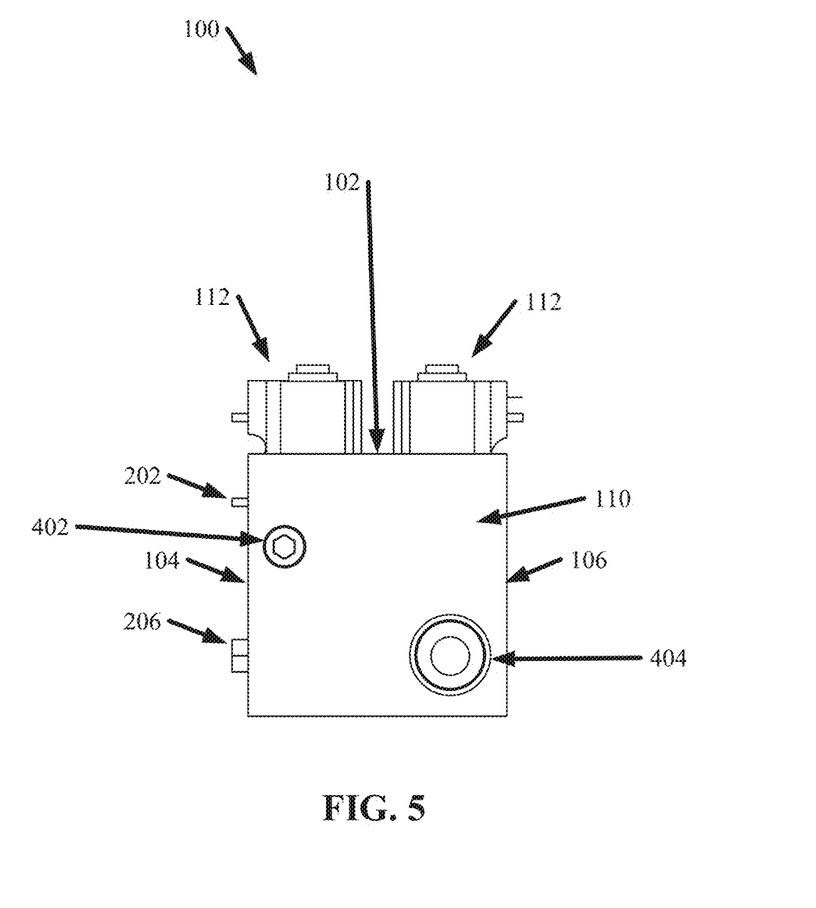
FIG. 5 illustrates another diagram of the example, non-limiting manifold from a fifth perspective in accordance with one or more embodiments described herein.

FIG. 5 illustrates a diagram of an example, non-liming embodiment of the fifth side 110 of the manifold 100. Repetitive description of like elements employed in other embodiments described herein is omitted for sake of brevity. The fifth side 110 can comprise one or more atmosphere ports 402 connected to the same one or more atmosphere channels connected to the one or more atmosphere ports 402 comprising the fourth side 108. Similarly, the fifth side 110 can comprise one or more vacuum ports 404 connected to the same on or more vacuum channels connected to the one or more vacuum ports 404 comprising the fourth side 108.

In various embodiments, the one or more atmosphere ports 402 comprising the fifth side 110 can connect to the same one or more atmosphere channels connected to the one or more atmosphere ports 402 comprising the fourth side 108. For example, a vacuum channel can traverse the manifold 100 through the body 101, whereupon the vacuum channel can be connected to a first vacuum port 404 at the fourth side 108 and a second vacuum port 404 at the fifth side 110. Additionally, an atmosphere channel can traverse the manifold 100 through the body 101, whereupon the atmosphere channel can be connected to a first atmosphere port 402 at the fourth side 108 and a second atmosphere port 402 at the fifth side 110. As the vacuum channel traverses from one vacuum port 404 to another vacuum port 404, it can connect to one or more work channels. Also, as the atmosphere channels traverses from one atmosphere port 402 to another atmosphere port 402, it can connect to one or more work channels.

Figure 6:
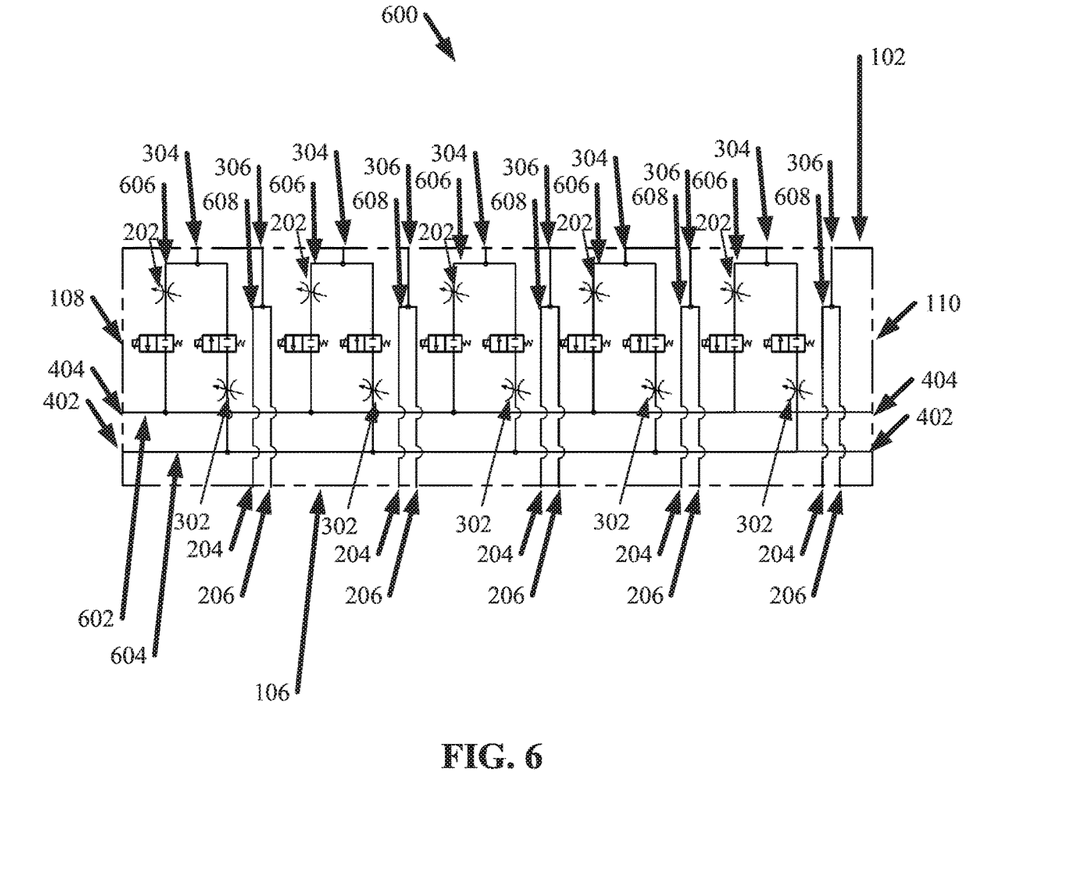
FIG. 6 illustrates a diagram of an example, non-limiting flow path that can be facilitated by a manifold in accordance with one or more embodiments described herein.

FIG. 6 illustrates a diagram of an example, non-limiting flow scheme 600 that can regard one or more pathways facilitated by various channels housed in the manifold's 100 body 101. Repetitive description of like elements employed in other embodiments described herein is omitted for sake of brevity. The flow scheme 600 can comprise one or more vacuum pathways 602, one or more atmosphere pathways 604, one or more work pathways 606, and/or one or more test pathways 608. In various embodiments, the manifold 100 can facilitate a flow scheme 600 in which a vacuum pathway 602 and/or an atmosphere pathway 604 can connect to one or more work pathways 606, wherein the one or more work pathways 606 can also connect to one or more work systems and said work systems can further connect to one or more test pathways 608.

As shown in FIG. 6, one or more vacuum pathways 602 can traverse the body 101 from a first vacuum port 404 located at the fourth side 108 to a second vacuum port 404 located at the fifth side 110. A structure and/or guidance of the one or more vacuum pathway 602 can be defined by one or more vacuum channels housed within the body 101 of the manifold 100. Similarly, one or more atmosphere pathways 604 can traverse the body 101 from a first atmosphere port 402 located at the fourth side 108 to a second atmosphere port 402 located at the fifth side 110. A structure and/or guidance of the one or more atmosphere pathway 604 can be defined by one or more atmosphere channels housed within the body 101 of the manifold 100.

As the one or more vacuum pathway 602 and/or the one or more atmosphere pathway 604 traverse the manifold 100, they can connect to one or more work pathways 606. A structure and/or guidance of the one or more work pathways 606 can be defined by one or more work channels housed within the body 101 of the manifold 100. The work pathway 606 can connect a vacuum pathway 602 and/or an atmosphere pathway 604 to a work port 304. The work pathways 606 can comprise a plurality of junctions that can be controlled by the one or more valves 112. For example, one or more junctions (e.g., represented by "✶" in FIG. 6) can be located along a work pathway 606 between a vacuum pathway 602 and/or a work port 304, wherein the junction can be controlled (e.g., electrically controlled, as indicated by "⌁" in FIG. 6) by a valve 112 comprising a column 114 associated with said work port 304. Thus, a valve 112 can control the amount of vacuum supplied to the work port 304 from the vacuum pathway 602. Similarly, for example, one or more additional junctions can be located along the work pathway 606 between an atmosphere pathway 604 and/or the work port 304, wherein the additional junction can be controlled (e.g., electrically) by the other valve 112 comprising the column 114 associated with the work port 304. Thus, the other valve 112 can control the amount of atmosphere supplied to the work port 304 from the atmosphere pathway 604.

FIG. 6 further illustrates one or more test pathways 608 that can connect one or more connection ports 204 and one or more monitoring ports 206 to one or more test ports 306. A structure and/or guidance of the test pathways 608 can be defined by one or more test channels housed within the body 101 of the manifold 100.

FIG. 6 illustrates an example flow scheme 600 that can correlate to the manifold 100 embodiments illustrated in FIGS. 1-5, wherein the manifold 100 can be capable of controlling and/or monitoring up to five work systems. In example flow scheme 600, a single vacuum pathway 602 and/or a single atmosphere pathway 604 can supply vacuum and/or atmosphere to any of five work pathways 606 to facilitate the controlling of each work system connected to the manifold 100. Additionally, five test pathways 608 can facilitate monitoring of each work system controlled by the manifold 100. However, the flow facilitated by the manifold 100 is not limited to the particular layout illustrated in FIG. 6. One of ordinary skill in the art will recognize that flow scheme 600 can be altered to accommodate a various number of work ports 304, test ports 306, valves 112, columns 114, atmosphere ports 402, vacuum ports 404, connection ports 204, and/or monitoring ports 206 while still providing the functionality described herein.

Figure 7:
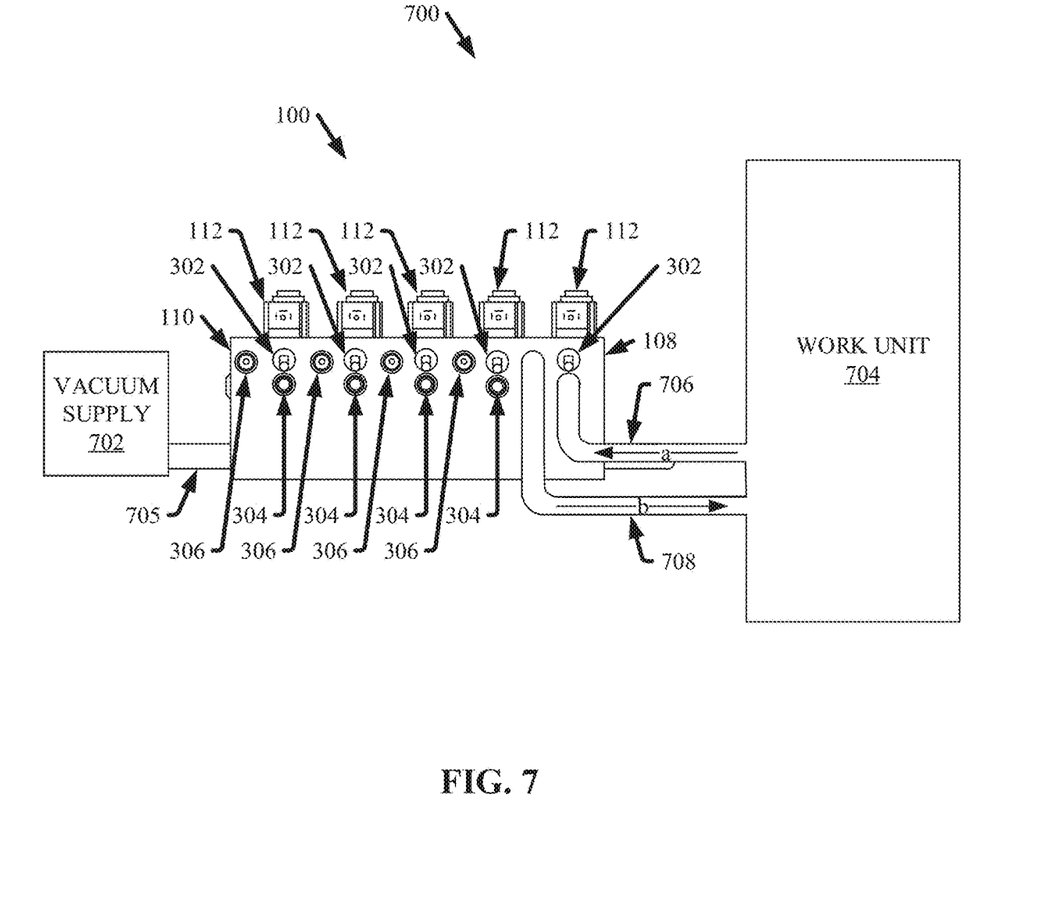
FIG. 7 illustrates a diagram of an example, non-limiting manifold system in accordance with one or more embodiments described herein.

FIG. 7 illustrates a diagram of an example, non-limiting manifold system 700 comprising the manifold 100 in accordance with one or more embodiments described herein. Repetitive description of like elements employed in other embodiments described herein is omitted for sake of brevity. The manifold system 700 can comprise the manifold 100, a vacuum supply 702, and a work unit 704.

As shown in FIG. 7, the manifold 100 can be connected to one or more vacuum supplies 702. The vacuum supply 702 can comprise one or more devices that can generate a vacuum. The manifold 100 can be connected to the one or more vacuum supplies 702 via one or more vacuum lines 705 (e.g., pipes, tubes, and/or the like). Further, the vacuum supply 702 can be connected to the one or more vacuum ports 404 of the manifold 100. Thus, the one or more vacuum supplies 702 can generate a vacuum that is propagated through the one or more vacuum pathways 602.

Also, the manifold 100 (e.g., via the valves 112, columns 114, work pathways 606, and/or work ports 304) can control the release of the vacuum in the one or more vacuum pathways 602 to a work unit 704. For example, one or more work lines 706 (e.g., pipes, tubes, and/or the like) can connect one or more work ports 304 to one or more work units 704. The work unit 704 can comprise one or more devices having an atmosphere controlled and/or monitored by the manifold 100 (e.g., an oven). One or more work pathways 606, as controlled by one or more valves 112, can facilitate a fluid connection between a work port 304 and the vacuum generated by the one or more vacuum supplies 702, wherein said connection can extend from said work port 304 to one or more work units 704 via one or more work lines 706. Thus, the vacuum generated by a vacuum supply 702 can access the work unit 704, via control by the manifold 100, and thereby draw atmosphere out of the work unit 704 in a direction depicted by arrow "a" in FIG. 7. One or more parameters of the vacuum interaction with the work unit 704 can be controlled by one or more valves 112 which can: (1) turn on/off and/or proportionate the amount of vacuum (e.g., from a vacuum pathway 602) supplied to the work port 304 and thereby the one or more work lines 706; and/or (2) turn on/off and/or proportionate the amount of atmosphere (e.g., from an atmosphere pathway 604) supplied to the work port 304 and thereby the one or more work lines 706. Therefore, by controlling the amount of vacuum and/or atmosphere supplied to the one or more work lines 706 (e.g., via one or more valves 112 manipulating the one or more work pathways 606), the manifold 100 can control the amount of atmosphere withdrawn from the work unit 704.

Additionally, the manifold 100 can be connected to the work unit 704 via one or more test lines 708 (e.g., pipes, tubes, and/or the like). The one or more test lines 708 can connect to one or more test ports 306. Thus, the manifold 100 can facilitate a fluid connection between one or more test devices and the one or more work units 704 via one or more connection ports 204, one or more test pathways 608, one or more test ports 306, and/or one or more test lines 708. For example, the one or more test devices (e.g., a transducer) can supply atmosphere to the work unit 704 along the one or more test lines 708 in a direction indicated by arrow "b" in FIG. 7. Wherein the manifold system 100 is a closed system, the atmosphere supplied by one or more test lines 708 can be thereby withdrawn via the one or more work lines 706. Further, one or more monitoring devices, for example connected to one or more monitoring ports 206, can monitor the effects rendered by the testing equipment to thereby monitor the environment of the work unit 704 and/or one or more performance parameters of the vacuum controlled by the manifold 100.

A combination of the one or more work units 704, one or more work lines 706, and/or one or more test lines 708 can comprise a work system. Further, while FIG. 7 illustrates a manifold 100 connected to a single work unit 704, and thereby controlling and/or monitoring a single work system, the manifold 100 can also be connected to additional work units 704, and thereby control and/or monitor additional work systems. Moreover, wherein a manifold 100 is capable of controlling and/or monitoring more work systems than that which are connected to the manifold 100, any unused features of the manifold 100 (e.g., ports and/or valves 112) can be capped to sustain a closed system.

In addition, FIG. 7 illustrates a manifold 100 that is in fluid communication with the surrounding air via the one or more atmosphere ports 402. Thus, atmosphere leaked into a work system can comprise air surrounding the manifold 100 and introduced via the one or more atmosphere ports 402. In various embodiments, the one or more atmosphere ports 402 can be connected to an inert gas rather than the surrounding atmosphere. Additionally, in some embodiments, the one or more atmosphere ports 402 can be connected to one or more mufflers and/or filters to prevent debris from entering the manifold 100. Also, in one or more embodiments, one or more filters can be added to the one or more wok lines 706 and/or the one or more test lines 708.

Figure 8:
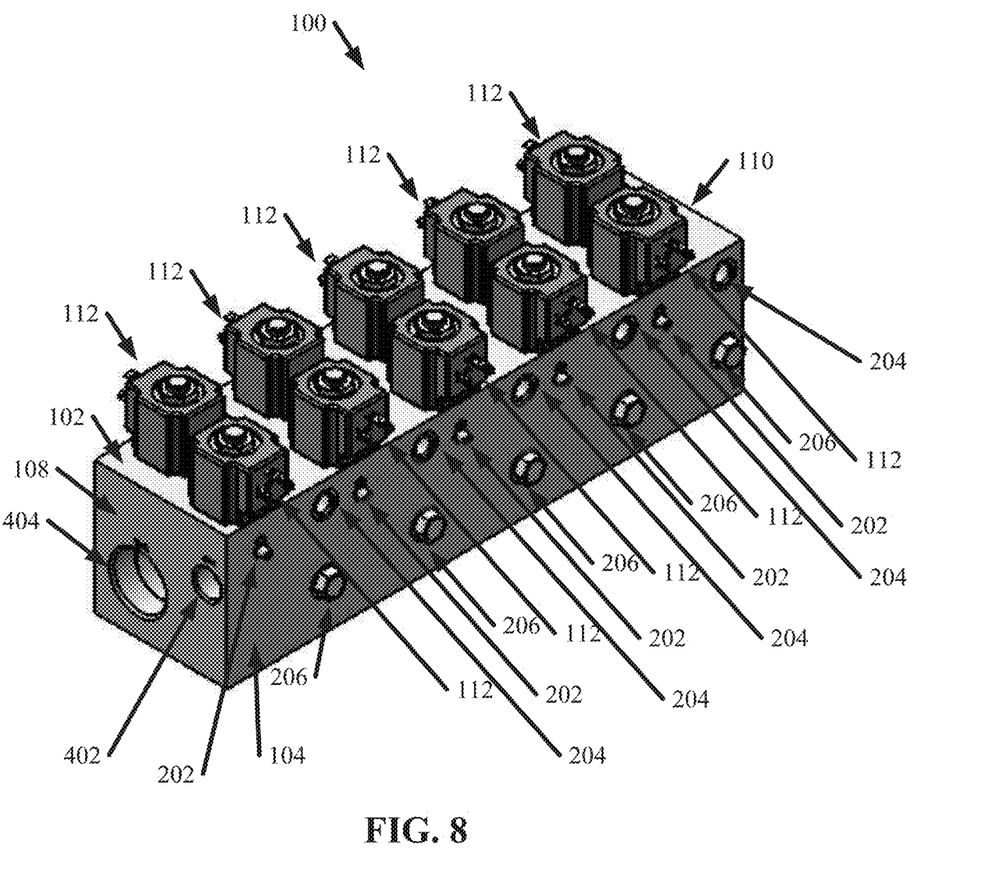
FIG. 8 illustrates a three-dimensional (3D) diagram of the example, non-limiting manifold from a sixth perspective in accordance with one or more embodiments described herein.

FIG. 8 illustrates a 3D model of an example, non-limiting manifold 100 in accordance with one or more embodiments described herein. Repetitive description of like elements employed in other embodiments described herein is omitted for sake of brevity. As shown in FIG. 8, one or more of the atmosphere ports 402 and/or the vacuum ports 404 can be threaded to accept one or more vacuum lines 705 and/or atmosphere lines (e.g., pipes, tubes, and/or the like, which connect the manifold 100 to an atmosphere source and/or one or more filters).

Figure 9:
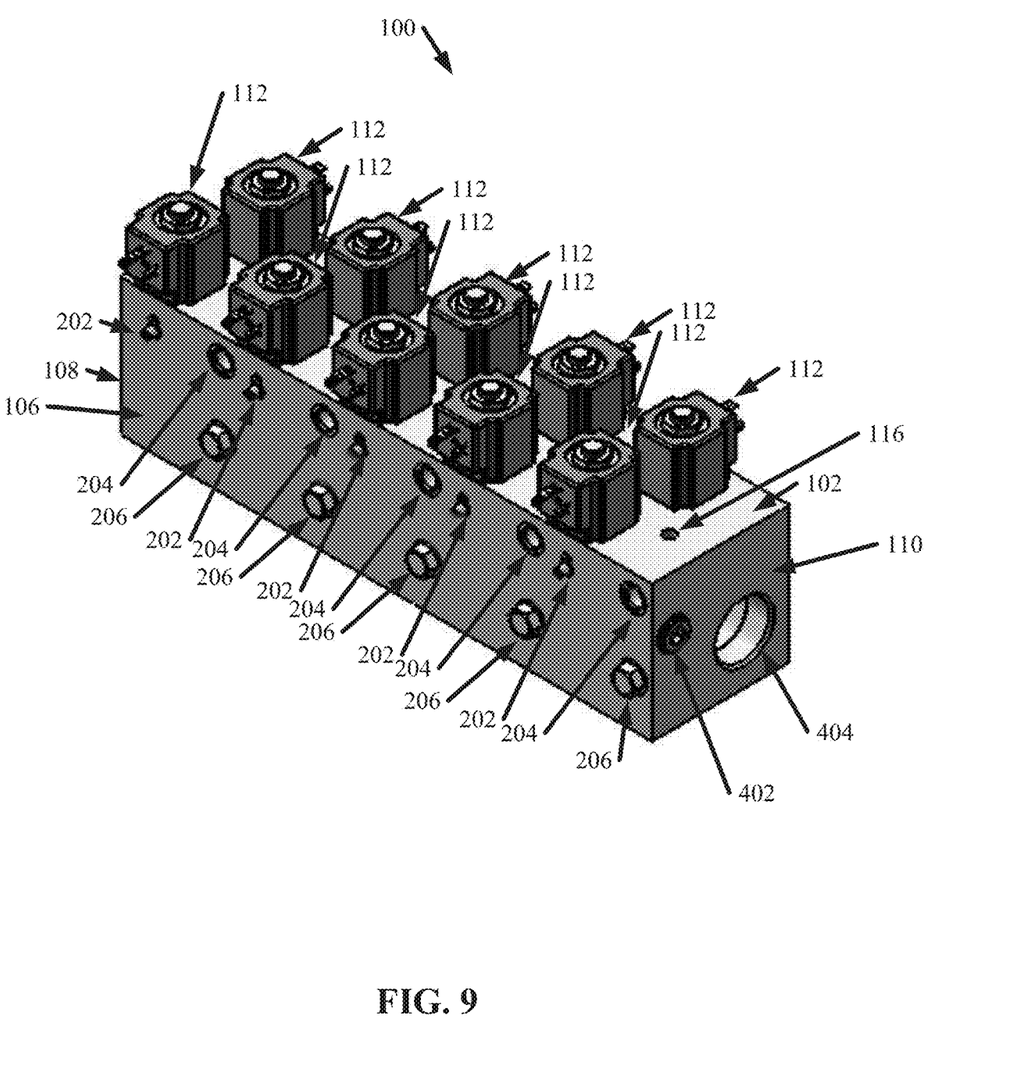
FIG. 9 illustrates another 3D diagram of the example, non-limiting manifold from a seventh perspective in accordance with one or more embodiments described herein.

FIG. 9 illustrates another 3D model of an example, non-limiting manifold 100 in accordance with one or more embodiments described herein. Repetitive description of like elements employed in other embodiments described herein is omitted for sake of brevity. As shown in FIG. 9, one or more of the atmosphere ports 402 can comprise a plug to accept one or more atmosphere lines.

Figure 10:
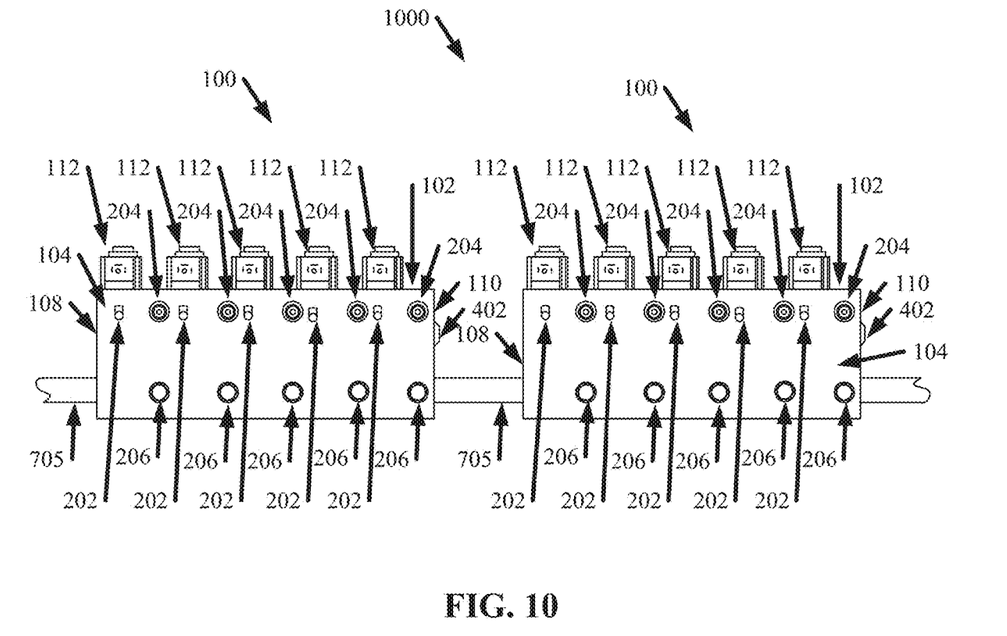
FIG. 10 illustrates a diagram of another example, non-limiting manifold system in accordance with one or more embodiments described herein.

FIG. 10 illustrates a diagram of an example, non-limiting second manifold system 1000. Repetitive description of like elements employed in other embodiments described herein is omitted for sake of brevity. The second manifold system 1000 can comprise two connected manifolds 100. Each manifold 100 comprising the second manifold system 1000 can comprise the various features described herein.

The first manifold 100 can be connected to the second manifold 100 via one or more vacuum lines 705. For example, one or more vacuum lines 705 can connect a first vacuum port 404 on the fifth side 110 of the first manifold 100 to a second vacuum port 404 on the fourth side 108 of the second manifold 100. Further, one of the manifolds 100 (e.g., the first manifold 100) can be connected to one or more vacuum supplies 702 via one or more additional vacuum lines 705 (e.g., connected to one or more vacuum ports 404 on the first manifold's 100 fourth side 108). Thus, one or more vacuum supplies 702 can generate a common vacuum that can be propagated through all the manifolds 100 of the second manifold system 1000 via one or more connecting vacuum lines 705. For example, a single vacuum supply 702 can generate a common vacuum to be utilized by both the first manifold 100 and the second manifold 100.

In various embodiments, the first manifold 100 and the second manifold 100 can also be connected by one or more atmosphere lines (not shown). For example, one or more atmosphere lines can connect a first atmosphere port 402 on the fifth side 110 of the first manifold 100 to a second atmosphere port 402 on the fourth side 108 of the second manifold 100. Further, one of the manifolds 100 (e.g., the first manifold 100) can be connected to one or more atmosphere supplies via one or more additional atmosphere lines (e.g., connected to one or more atmosphere ports 402 on the first manifold's 100 fourth side 108). Thus, one or more atmosphere supplies can provide a common atmosphere that can be propagated through all the manifolds 100 of the second manifold system 1000 via one or more connecting atmosphere lines. For example, a single atmosphere supply can be utilized by both the first manifold 100 and the second manifold 100.

While FIG. 10 illustrates the second manifold system 1000 comprising two manifolds 100, additional manifolds 100 are also envisaged. One of ordinary skill in the art will recognize that numerous manifolds 100 can be connected to control a variety of work systems. For example, additional dozens, hundreds, and/or thousands of manifolds 100 can comprise the second manifold system 1000.

In various embodiments, the manifold 100 can be manufactured by milling one or more vacuum channels, one or more atmosphere channels, one or more work channels, and/or one or more test channels out of a block of material that comprises the manifold's 100 body 101. Thus, the manifold 100 can eliminate a need for piping and/or tubing various vacuums, atmosphere supplies, filters, valves, testing devices and/or monitoring devices together; rather said vacuums, atmosphere supplies, filters, valves, testing devices, and/or monitoring devices can simply be connected to the manifold 100 (e.g., via the various ports).

Furthermore, while various embodiments described herein describe the manifold 100 regarding utilizing a vacuum to withdraw atmosphere from a work system; in one or more embodiments, the manifold 100 can be utilized to pressurize a work system. For example, the manifold 100 can supply atmosphere (e.g., an inert gas) into a work system. Thus, the various embodiments described herein can regard a manifold 100, and one or more manifold systems (e.g., 700 and 1000), that can control the atmosphere of a work system by either withdrawing from and/or adding to the work system's atmosphere.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of apparatuses and methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A manifold, comprising: a manifold body, comprising:
   a first channel connected to a first inlet port;
   a second channel connected to a second inlet port; and
   a third channel connecting the first channel, the second channel, and an outlet port, wherein the third channel extends from the first channel and the second channel to the outlet port within a body of the manifold;
   a valve connected to the third channel and regulating fluid communication through the third channel; and
   wherein the third channel connects to the first channel and the second channel outside the valve; and
   a second valve connected to the third channel;
   wherein the valve is configured to regulate fluid communication through the third channel between the first inlet port and the outlet port, and the second valve is configured to regulate fluid communication through the third channel between the second inlet port and the outlet port; and
   a fourth channel connecting the first channel, the second channel, and a second outlet port together; and
   a third valve connected to the fourth channel and configured to regulate fluid communication through the fourth channel.

2. The manifold of claim 1, wherein the manifold body further comprises:
   a fourth channel connecting a third inlet port and a fourth inlet port to a second outlet port.

3. The manifold of claim 2, wherein the first inlet port facilitates a first attachment of a vacuum supply to the manifold, wherein the second inlet port facilitates a second attachment of an atmosphere supply to the manifold, wherein the third inlet port facilitates a third attachment of a testing device to the manifold, wherein and the fourth inlet port facilitates a fourth attachment of a monitoring device to the manifold.

4. The manifold of claim 3, wherein the first inlet port is in fluid communication with a vacuum supply, and the second inlet port is in fluid communication with an atmosphere supply.

5. The manifold of claim 1, further comprising:
   a fourth valve connected to the fourth channel; and
   wherein the third valve is configured to regulate fluid communication through the fourth channel between the first inlet port and the second outlet port, and the fourth valve is configured to regulate fluid communication through the fourth channel between the second inlet port and the second outlet port.

6. The manifold of claim 5, wherein the first inlet port is in fluid communication with a vacuum supply, and the second inlet port is in fluid communication with an atmosphere supply.

7. The manifold of claim 6, wherein the fourth channel is also defined within the body of the manifold.

8. The manifold of claim 7, wherein the outlet port is connected to a first device having a first atmosphere controlled by the manifold in accordance with a first parameter, and the second outlet port is connected to a second device having a second atmosphere controlled by the manifold in accordance with a second parameter.

9. A system comprising: a manifold body that houses a plurality of channels and comprises:
   a first channel from the plurality of channels connected to a first inlet port;
   a second channel from the plurality of channels connected to a second inlet port; and
   a third channel from the plurality of channels connecting the first channel, the second channel, and an outlet port, wherein the third channel extends from the first channel and the second channel to the outlet port within a body of the manifold; and
   a valve connected to the third channel and regulating fluid communication through the third channel, wherein the third channel connects to the first channel and the second channel outside the valve; and
   a second valve connected to the third channel;
   wherein the valve is configured to regulate fluid communication through the third channel between the first inlet port and the outlet port, and the second valve is configured to regulate fluid communication through the third channel between the second inlet port and the outlet port; and
   a fourth channel connecting the first channel, the second channel, and a second outlet port together; and
   a third valve connected to the fourth channel and configured to regulate fluid communication through the fourth channel.

10. The system of claim 9, wherein the manifold body further comprises:
    a fourth channel connecting a third inlet port and a fourth inlet port to a second outlet port.

11. The system of claim 10, wherein the first inlet port facilitates a first attachment of a vacuum supply to the manifold body, wherein the second inlet port facilitates a second attachment of an atmosphere supply to the manifold body, wherein the third inlet port facilitates a third attachment of a testing device to the manifold body, and wherein the fourth inlet port facilitates a fourth attachment of a monitoring device to the manifold.

12. The system of claim 11, wherein the outlet port facilitates a connection to a device having an atmosphere controlled by the system in accordance with a parameter, and the second outlet port facilitates another connection to the device.

13. The system of claim 9, further comprising:
    a second manifold body that houses a plurality of channels and comprises:
      a fourth channel from the second plurality of channels connected to a third inlet port;
      a fifth channel from the second plurality of channels connected to a fourth inlet port;
      a sixth channel from the second plurality of channels connecting the fourth channel, the fifth channel, and a second outlet port; and
    a second valve connected to the sixth channel and regulating fluid communication through the sixth channel, wherein the sixth channel connects to the fourth channel and the fifth channel outside the second valve.

14. The system of claim 13, wherein the manifold body further comprises a third outlet port connected to the first channel, and a conduit connects the third outlet port of the manifold to the third inlet port of the second manifold body.

15. A manifold comprising: a manifold body that houses a plurality of channels comprising:
    a vacuum channel from the plurality of channels connected to a vacuum inlet port;

an atmosphere channel from the plurality of channels connected to an atmosphere inlet port; and a work channel from the plurality of channels connecting the vacuum channel, the atmosphere channel, and an outlet port, wherein the work channel extends from the vacuum channel and the atmosphere channel to the outlet port within a body of the manifold; and a valve connected to the work channel and configured to regulate fluid communication through the work channel, wherein the work channel connects to the vacuum channel and the atmosphere channel outside the valve; and a second valve connected to the work channel;

wherein the valve is configured to regulate fluid communication through the work channel between the vacuum inlet port and the outlet port, and the second valve is configured to regulate fluid communication through the work channel between the atmosphere inlet port and the outlet port; and a test channel connecting the vacuum channel, the atmosphere channel, and a second outlet port together; and a third valve connected to the test channel and configured to regulate fluid communication through the test channel.

16. The manifold of claim 15, wherein the plurality of channels further comprises a test channel connecting a test inlet port and a monitoring inlet port to a second outlet port.

17. The manifold of claim 16, wherein the vacuum inlet port facilitates a first attachment of a vacuum supply to the manifold body, wherein the atmosphere inlet port facilitates a second attachment of an atmosphere supply to the manifold body, wherein the test inlet port facilitates a third attachment of a testing device to the manifold body, and the monitoring inlet port facilitates a fourth attachment of a monitoring device to the manifold body.

* * * * *